(12) United States Patent
Gebers et al.

(10) Patent No.: US 12,209,196 B2
(45) Date of Patent: Jan. 28, 2025

(54) OPTICAL COATING HAVING A LOW REFRACTIVE INDEX

(71) Applicant: BASF Coatings GmbH, Münster (DE)

(72) Inventors: Jan Gebers, Basel (CH); Sven Olle Krabbenborg, Muenster (DE); Jan-Bernd Kues, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 1652 days.

(21) Appl. No.: 16/462,835

(22) PCT Filed: Nov. 20, 2017

(86) PCT No.: PCT/EP2017/079789
§ 371 (c)(1),
(2) Date: May 21, 2019

(87) PCT Pub. No.: WO2018/095866
PCT Pub. Date: May 31, 2018

(65) Prior Publication Data
US 2023/0139823 A1 May 4, 2023

(30) Foreign Application Priority Data

Nov. 22, 2016 (EP) ..................................... 16200087

(51) Int. Cl.
| | |
|---|---|
| *C09D 129/04* | (2006.01) |
| *B05D 3/02* | (2006.01) |
| *B05D 5/10* | (2006.01) |
| *B82Y 30/00* | (2011.01) |
| *C08K 3/36* | (2006.01) |
| *C09D 5/00* | (2006.01) |
| *C09D 7/40* | (2018.01) |
| *C09D 7/61* | (2018.01) |

(52) U.S. Cl.
CPC .......... *C09D 129/04* (2013.01); *B05D 3/0254* (2013.01); *B05D 5/10* (2013.01); *C08K 3/36* (2013.01); *C09D 5/006* (2013.01); *C09D 7/61* (2018.01); *C09D 7/67* (2018.01); *B82Y 30/00* (2013.01)

(58) Field of Classification Search
None
See application file for complete search history.

(56) References Cited

U.S. PATENT DOCUMENTS

| | | | |
|---|---|---|---|
| 6,410,123 B1 | 6/2002 | Otani et al. | |
| 7,821,691 B2 | 10/2010 | Walter et al. | |
| 9,329,315 B2 | 5/2016 | Watanabe et al. | |
| 2003/0116719 A1 | 6/2003 | Miyazawa | |
| 2008/0276835 A1 | 11/2008 | Koyama et al. | |
| 2010/0035039 A1 | 2/2010 | Jing et al. | |
| 2014/0308529 A1 | 10/2014 | Hardinghaus et al. | |
| 2015/0331150 A1* | 11/2015 | Furholz | C09D 129/04 428/312.6 |
| 2016/0096969 A1* | 4/2016 | Jindal | B05D 3/0272 427/407.1 |
| 2018/0187043 A1 | 7/2018 | Noatschk et al. | |
| 2018/0187044 A1 | 7/2018 | Noatschk et al. | |

FOREIGN PATENT DOCUMENTS

| | | |
|---|---|---|
| CN | 103975028 A | 8/2014 |
| JP | 2007076045 A | 3/2007 |
| KR | 20150011825 A | 2/2015 |
| WO | 2006040304 A1 | 4/2006 |
| WO | 2008011919 A1 | 1/2008 |
| WO | 2013019770 A1 | 2/2013 |
| WO | 2013055951 A1 | 4/2013 |
| WO | 2013117334 A1 | 8/2013 |
| WO | 2014193573 A1 | 12/2014 |

OTHER PUBLICATIONS

International Search Report and Written Opinion for International Application No. PCT/EP2017/079789, Issued on Jan. 29, 2018, 10 pages.
Anonymous, "Snowtex®", Nissan Chemical Industries, Ltd., XP055359372, Feb. 15, 2015. 3 pages.
Database WPI, Week 200741, Thomson Scientific, London, GB; AN 2007-425719, XP002768662, 2007, 1 page.
European Search Report for EP Patent Application No. 16200087.1, Issued on Apr. 7, 2017, 3 pages.

* cited by examiner

*Primary Examiner* — Michael Forrest
(74) *Attorney, Agent, or Firm* — Armstrong Teasdale LLP

(57) ABSTRACT

Described herein is a coating composition including a polymer containing hydroxy groups, such as a water soluble polyvinyl alcohol, and further including a tetraalkoxysilane and modified silica nanoparticles having a positively charged surface, where the coating composition shows advantageous properties such as low refractive index, good transparency and low haze.

15 Claims, No Drawings

OPTICAL COATING HAVING A LOW REFRACTIVE INDEX

CROSS-REFERENCE TO RELATED APPLICATIONS

This application is a U.S. National Phase Application of PCT/EP2017/079789, filed Nov. 20, 2017, which claims the benefit of priority to European Patent Application No. 16200087.1, filed Nov. 22, 2016, the entire contents of which are hereby incorporated by reference herein.

FIELD OF INVENTION

Present invention relates to a novel composition for the preparation of porous coatings of low refractive index, e.g. for optical purposes such as antireflex coatings, optical devices or porous substrates, a method for preparing such coatings, and the use of such coatings e.g. in photovoltaic devices, security elements or features, waveguiding applications (e.g. as cladding layer), lighting applications, light concentration devices, optical adhesives.

BACKGROUND

Coatings of low refractive index are widely used, especially in optical devices, for reducing undesired reflections on surfaces between ambient air or vacuum and optical materials such as glass or suitable plastics. As described in U.S. Pat. No. 7,821,691 and documents cited therein, a convenient method for obtaining a material whose refractive index is lowered in comparison to the one of these typical bulk materials is the inclusion of voids to obtain porous phases, e.g. by incorporating optically neutral particles into such materials. Optically neutral particles are to be understood as particles which do not cause noticeable absorption or scattering of the light transmitted.

Porous layers, and layers comprising particles, have also been used as ink receiving layer in printable materials, or for improving abrasion resistance of a surface equipped with such a layer. WO 2006/040304 describes certain coatings comprising modified silica particles, polyvinyl alcohol and boric acid, for use in ink jet recording materials. WO 2014/193573 describes a reinforced coating prepared by dispersing silica nanoparticles in polyvinyl alcohol and crosslinking.

WO 2013/019770 proposes an antireflex coating comprising SiO2-nanoparticles, a matrix polymer and a silane binder; a similar coating is described in WO 2013/055951. WO 2008/011919 and WO 2013/117334 disclose certain nanoporous layers for optical applications, whose polymer matrix is typically based on polyvinyl alcohol hardened with boric acid; layers of WO 2013/117334 contain silica particles with positively charged surface (PCS), and show a refractive index below 1.2.

DESCRIPTION

It has now been found that nanoporous layers of low refractive index, which are based on silica particles in a crosslinked matrix of hydrophilic polymer, show surprisingly good mechanical and optical properties such as low haze, good stability against UV exposure and/or exposure to humidity, adhesion to polymer substrate such as PET or a further layer of hydrophilic polymer, and that such layers may conveniently be laminated to such further layers, if an alkoxysilane such as tetraethoxysilane (TEOS) is used as the crosslinking agent. Using a silane crosslinker instead of boron compounds may further improve the environmental compatibility of such materials. Besides the effect of low reflectance, porous coatings of the invention are further useful for modifying interfacial tension, reducing hydrophobicity and improving interlayer adhesion. A convenient way to obtain materials showing especially low refractive properties is to increase the particle content, typically expressed as the weight ratio of silica particles to hydrophilic polymer in such materials. The dependency of refractive index from particle loading is shown in the below table (compositions consisting of modified SiO2 nanoparticles, polyvinylalcohol and water as shown in the control compositions of the below example 3):

|  | ratio SiO2/PVA | | | | | | |
| --- | --- | --- | --- | --- | --- | --- | --- |
|  | 20:1 | 12:1 | 4:1 | 2:1 | 1.5:1 | 1.2:1 | 1:1 |
| refraxtive index | 1.153 | 1.158 | 1.201 | 1.294 | 1.338 | 1.497 | 1.500 |

It is a further advantage of present invention, that such highly particle-loaded materials according to the invention show especially low haze.

The invention thus primarily pertains to a composition comprising
  a) a polar polymer,
  b) a tetraalkoxysilane, and
  c) modified silica nanoparticles having a positively charged surface.

The polar polymer component (a) generally is water soluble or well dispersable in water, and/or contains hydroxy groups. Examples for such polymers are polyvinyl alcohol, hydroxyacrylates and copolymers of vinylalcohol and/or hydroxyacrylates; typically, such copolymers may be statistical or block copolymers, consisting of at least 30%, preferably at least 50%, more preferably at least 70%, and most preferably at least 90% repeating units containing a hydroxy group such as vinylalcohol, hydroxyalkylacrylate, hydroxyalkylmethacrylate. Especially preferred as component (a) is polyvinyl alcohol. Preferably, the polar polymer (a) is added to the present composition in form of a homogenous aqueous solution.

The tetraalkoxysilane (b) typically is of the formula $Si(OR)_4$, wherein R is $C_1$-$C_4$alkyl; especially preferred is tetraethoxysilane (TEOS).

Silica nanoparticles having a positively charged surface useful as present component (c), as well as methods for their preparation, are well known in the art; see, for example, WO 2013/117334. These particles are characterized by a Zeta potential larger than 0 mV, typically of more than +20 mV; for example, the Zeta potential is from the range +20 to +50 mV. Due to the preparation, these particles typically contain a certain amount of aluminium and/or zirconium. Thus, suspensions containing the present particles typically are of pH 7 or lower. Useful particles of these classes are commercially available, e.g. CAB-O-SPERSE® PG022 from Cabot Corp. (US).

The silica nanoparticles, which are present in the composition of the invention, typically have an average particle diameter as determined by dynamic light scattering from the range 10 to 500 nm, preferably 20 to 200 nm, more preferably from the range 30 to 150 nm, for example 70 to 120 nm. Silicon oxide particles like those mentioned above typically are aggregates, whose primary particles often show diameters from the range 1 to 50 nm, especially 5 to 20 nm (as determined by transmission electron microscopy). These particles of aforementioned size ranges generally are referred to as "nanoparticles"; aforementioned size ranges (also referred to as average particle diameters) refer to the diameter, where 50 mass-% (of the aggregates) of the sample have a larger diameter, and the other 50 mass-% have a smaller diameter. The diameter of the aggregates can also be measured by further techniques, e.g. using a centrifugal sedimentation particle size analyzer.

The weight ratio of the modified silica nanoparticles to the polar polymer typically is 1:1 or higher, for example, from the range 1:1 to 35:1. In order to obtain a material of low reflective index, the weight ratio of modified silica nanoparticles:the polar polymer should be higher than 1:1, for example from the range 1.5:1 to 35:1. In preferred embodiments, the weight ratio of modified silica nanoparticles:the polar polymer is 2:1 or higher, especially 4:1 or higher; for example, from the range 4:1 to 35:1, especially 5:1 to 30:1, more especially 6:1 to 30:1, and most especially 7:1 to 30:1. In an embodiment of special technical importance, the weight ratio of modified silica nanoparticles:the polar polymer is from the range 8:1 to 25:1. The modified silica nanoparticles preferably are added to the composition of the invention in form of an aqueous dispersion, typically containing from about 5 to about 50% by weight of the modified nanoparticles, the remainders being mainly water.

The composition of the invention is typically applied as an aqueous composition onto a suitable substrate, typically a transparent or optical substrate like glass or polymer film of further optical layer(s) and dried; drying often supports curing, and leads to removal of (some of the) volatiles such as water.

The invention thus primarily provides an aqueous composition useful inter alia as a coating composition. This composition typically consists, based on the total weight of the composition, of the following components:

from 0.1 to 10% b.w. of the polar polymer, especially water soluble polymer containing hydroxy groups,
from 0.5 to 20%, especially 0.5 to 16%, b.w. of the tetraalkoxysilane,
from 4 to 25% b.w. of the modified silica nanoparticles having a positively charged surface, and optionally
0 to 5% by weight of further components different from water, and water ad 100%,
where the weight ratio of the modified silica nanoparticles to the polar polymer is from the range indicated above.

Further components different from water typically are selected from polar organic solvents, surfactants, further polymers, further crosslinking agents, light stabilizers, antioxidants, rheologic or thixotropic agents, and/or levelling agents. Antioxidants may be, for example, selected from known phenolic antioxidants. Light stabilizers typically are selected from known radical scavengers such as sterically hindered amines, and/or UV absorbers, especially polar agents of these classes showing a certain miscibility with water such as widely used for water borne coatings. Examples of some useful components are described, inter alia, in Ullmann's Encyclopedia of Industrial Chemistry, 5th Edition, Vol. A18, pp. 429-471, VCH, Weinheim 1991.

The wet composition is typically applied onto a substrate by a coating technique such as spin coating, bar coating, printing, curtain coating.

Preferably, 100% b.w. of non-volatile components of present composition (also referred to as "solids" hereinbelow) consist of:

3 to 60% b.w. (especially 3 to 30%) of the polar polymer, especially water soluble polymer containing hydroxy groups,
1 to 30% b.w. of the tetraalkoxysilane (especially 3 to 30%),
39 to 95% b.w., especially 80 to 95%, of the modified silica nanoparticles having a positively charged surface, and optionally
0 to 10% by weight (especially 0 to 6%) of further components such as noted above.

The composition may be dried after application, e.g. under air or a protective gas such as nitrogen, under reduced pressure, and/or application of heat (e.g. 40 to 100°, especially 50 to 80° C.). Drying also effects crosslinking (i.e. curing) of the present composition.

Surfactants typically are cationic or especially non-ionic. In an embodiment of specific technical interest, the composition of the invention contains little or none of the surfactant; for example, the amount of surfactant in such composition of the invention being from the range 0-1% b.w. of solids, especially less than 0.2% such as from 0.001% up to 0.2% b.w. of solids.

The amount of light stabilizers and antioxidants each typically is from the range 0 to 5% b.w. of the polar polymer.

The invention thus further provides a cured composition obtainable by drying of a wet composition described above.

Curing is generally effected by drying, e.g. under air, dry gas stream (e.g. air or nitrogen), reduced pressure, elevated temperatures (e.g. as noted below) or a combination of such measures. Curing times and temperatures are not critical, curing time generally may range from a few seconds up to minutes or hours, while higher temperatures (e.g. 60-120° C.) may be used for shorter curing times (typically below 10 minutes), and lower temperatures (less than 60° C.) are used for curing times well above 5 minutes, e.g. 10 minutes or more).

All refractive indices (also mentioned as "index") are as determined for a radiation of 513.7 nm, if not indicated otherwise. In typical embodiments, the term "low refractive index" denotes a refractive index from the range 1.01 to less than 1.4, e.g. 1.05 to 1.3, especially 1.05 to less than 1.2.

The following examples illustrate the invention. Unless indicated otherwise, reactions take place at standard conditions, i.e. atmospheric pressure and room temperature (r.t.), which depicts a temperature from the range 22-25° C.; "over night" denotes a period of 12 to 15 hours; percentages are given by weight, if not indicated otherwise.

Abbreviations aq. aqueous
b.w. by weight
PVA polyvinyl alcohol (in the examples used: Mowiol® 90-88, Kuraray)
TEOS tetraethoxysilane (Si(OEt)$_4$ (99% grade from Wacker used in the examples)
PMMA polymethylmethacrylate (used in the examples: EVONIK, Folie farblos 99524 GT, thickness 0.5 mm)
PET polyethyleneterephthalate (used in the examples: (DuPont Teijin Films, Melinex ST504)

Example 1: Preparation of a Coating Composition

Positively charged silica particles are prepared in accordance with example 1 of WO 2013/117334 using aluminium chlorohydrate, boric acid, aq. formic acid, n-butylaminopropyltrimethoxysilane, fumed silica and aq. ammonium hydrogen carbonate in amounts and qualities as described. The dispersion containing 23% b.w. of particles is sonicated for 15 min while stirring the solution from time to time, and subsequently filtered through a 1 μm glass fiber syringe filter for use in the below composition.

The following components are combined in a closable glass bottle:

|  | Composition 1A | Composition 1B |
|---|---|---|
| silica dispersion | 37 g | 18.5 g |
| 7% aq. PVA | 12 g | 12 g |
| approx ratio SiO2/PVA | 10:1 | 5:1 |
| 5.26% aq. surfactant* | 0.8 g | 0.8 g |
| Si(OEt)$_4$ | 1.0 g | 1.0 g |
| H$_2$O | 10 g | 10 g |

*Surfactant: ABEX ® EP110 (anionic, Solvay)

The mixture is heated to 60° C. under vigorous stirring on a hot-plate (100° C.) for 1 h, and then allowed to cool to room temperature under stirring. The majority of air bubbles settles over night.

Example 2: Preparation of a Coating Composition

Positively charged silica particles are prepared in accordance with example 2 of WO 2013/117334 using aluminium chlorohydrate, n-butylaminopropyltrimethoxysilane, fumed silica and aq. ammonium hydrogen carbonate in amounts and qualities as described. The dispersion containing 25% b.w. of particles is sonicated for 15 min while stirring the solution from time to time, and subsequently filtered through a 1 μm glass fiber syringe filter for use in the below composition.

The following components are combined in a closable glass bottle:

|  | Composition 2A | Composition 2B |
|---|---|---|
| silica dispersion | 34 g | 17 g |
| 7% aq. PVA | 12 g | 12 g |
| approx ratio SiO2/PVA | 10:1 | 5:1 |
| 5.26% aq. surfactant* | 0.8 g | 0.8 g |
| Si(OEt)$_4$ | 1.0 g | 1.0 g |
| H$_2$O | 10 g | 10 g |

*Surfactant: ABEX ® EP110 (anionic, Solvay)

The mixture is heated to 60° C. under vigorous stirring on a hot-plate (100° C.) for 1 h, and then allowed to cool to room temperature under stirring. The majority of air bubbles settles over night.

Example 3: Preparation of a Coating Composition for Bar Coating

Positively charged silica particles are prepared in accordance with example 2 of WO 2013/117334 using aluminium chlorohydrate, n-butylaminopropyltrimethoxysilane, fumed silica and aq. ammonium hydrogen carbonate in amounts and qualities as described. The dispersion containing 25% b.w. of particles is heated to approximately 40° C. and a solution of 6.6% b.w. polyvinyl alcohol (Kuraray, Mowiol 18-88), deionized water and, where applicable, a 5.3% b.w. solution of Olin® 10G (non-ionic surfactant, Fitzgerald) in water are added. The mixture is stirred for several minutes (5-60 min) and TEOS (99%, Wacker) is added, where applicable. Before coating, the solutions were allowed to cool to r.t.

Compositions of the coating solutions are listed in the following tables.

TABLE 3a

Compositions of the invention (TEOS, no surfactant)

| Composition: | 3.1 | 3.2 | 3.3 | 3.4 |
|---|---|---|---|---|
| ratio SiO$_2$—NP:PVA | 20:1 | 12:1 | 4:1 | 1.2:1 |
| silica dispersion | 43.0 g | 42.2 g | 31.65 g | 18.5 g |
| 6.6% b.w. aq. PVA | 8.1 g | 13.2 g | 29.7 g | 58 g |
| TEOS | 0.48 g | 0.48 g | 0.48 g | 0.48 g |
| H$_2$O | 48.4 g | 44.1 g | 38.2 g | 23.0 g |

TABLE 3b

Control compositions (no crosslinker, no surfactant)

| Composition: | Cntl.1 | Cntl.2 | Cntl.3 | Cntl.4 |
|---|---|---|---|---|
| ratio SiO2/PVA | 20:1 | 12:1 | 4:1 | 1.2:1 |
| silica dispersion | 43.0 g | 42.2 g | 31.65 g | 18.5 g |
| 7% aq. PVA | 8.1 g | 13.2 g | 29.7 g | 58 g |
| H$_2$O | 48.9 g | 44.6 g | 38.6 g | 23.5 g |

TABLE 3c

Comparative compositions (boric acid as crosslinker)

| Composition: | C1 | C2 | C3 | C4 |
|---|---|---|---|---|
| ratio SiO2/PVA | 20:1 | 12:1 | 4:1 | 1.2:1 |
| silica dispersion | 43.0 g | 42.2 g | 31.65 g | 18.5 g |
| 7% aq. PVA | 8.1 g | 13.2 g | 29.7 g | 58 g |
| 5.3 wt % aq. surfactant | 1.44 g | 1.44 g | 1.44 g | 1.44 g |
| Boric acid | 0.29 g | 0.29 g | 0.29 g | 0.29 g |
| H$_2$O | 47.2 g | 42.9 g | 36.9 g | 21.8 g |

Example 4: Bar-Coating of the Coating Solutions

The coating solutions of example 3 are applied via bar-coater using a meyer-bar (10 or 25 μm wet film thickness) onto glass or PET substrates. Wet films of thickness 10 micrometer or 25 micrometer are dried at air for 1-10 min and then heated to 80° C. for 5 min. The resulting films are characterized by their transmission (BYK, HazeGard® plus), haze (ASTM D1003-13; BYK, HazeGard® plus), dry film thickness (micrometer; Metricon® prism coupler Model 2010/M) and refractive index (Metricon® prism coupler Model 2010/M; whereever mentioned in this example, refractive indices (mentioned below as "index") are as determined for a radiation of 513.7 nm). These characteristics are summarized in the following Tables:

TABLE 4.1

Characterization of dry films on glass
(25 micrometer wet thickness; asterisk denotes composition of the invention)

| Composition | Haze | % Transmission |
|---|---|---|
| 3.1* | 0.59 | 93.4 |
| Cntl.1 | 0.46 | 93.6 |
| C1 | 8.67 | 92.0 |
| 3.2* | 0.32 | 93.4 |
| Cntl.2 | 0.40 | 93.7 |
| C2 | 1.92 | 92.3 |
| 3.3* | 0.90 | 93.5 |

TABLE 4.1-continued

Characterization of dry films on glass
(25 micrometer wet thickness; asterisk
denotes composition of the invention)

| Composition | Haze | % Transmission |
|---|---|---|
| Cntl.3 | 0.77 | 93.6 |
| C3 | 0.48 | 93.7 |
| 3.4* | 1.09 | 93.6 |
| Cntl.4 | 1.71 | 93.1 |
| C4 | 1.27 | 94.2 |

TABLE 4.2

Characterization of dry films on PET (10 micrometer
wet thickness, dry thickness given in micrometer;
asterisk denotes composition of the invention)

| Composition | Haze | % Transmission | dry thickness | refractive index |
|---|---|---|---|---|
| 3.1* | 0.55 | 92.0 | 0.87 | 1.152 |
| Cntl.1 | 0.48 | 92.0 | 0.82 | 1.155 |
| C1 | 0.71 | 92.4 | 0.77 | 1.147 |
| 3.2* | 0.58 | 92.3 | | |
| Cntl.2 | 0.60 | 91.8 | | 1.162 |
| C2 | 0.93 | 92.4 | 0.91 | 1.154 |
| 3.3* | 0.60 | 92.7 | | |
| Cntl.3 | 0.53 | 92.2 | | |
| C3 | 0.57 | 92.7 | | |
| 3.4* | 1.09 | 93.2 | | |
| Cntl.4 | 1.42 | 92.4 | | |
| C4 | 1.38 | 93.3 | | |

TABLE 4.3

Characterization of dry films on PET (25 micrometer
wet thickness, dry thickness given in micrometer;
asterisk denotes composition of the invention)

| Composition | Haze | % Transmission | dry thickness | refractive index |
|---|---|---|---|---|
| 3.1* | 0.84 | 92.1 | 2.42 | 1.150 |
| Cntl.1 | 0.81 | 91.8 | 2.59 | 1.153 |
| C1 | 4.40 | 91.8 | 1.96 | 1.150 |
| 3.2* | 0.69 | 92.2 | 2.06 | 1.156 |
| Cntl.2 | 0.63 | 91.9 | 1.97 | 1.158 |
| C2 | 1.85 | 91.8 | 1.71 | 1.155 |
| 3.3* | 1.14 | 92.4 | 2.02 | 1.194 |
| Cntl.3 | 0.98 | 92.3 | 1.51 | 1.201 |
| C3 | 0.82 | 92.4 | 1.84 | 1.187 |
| 3.4* | 1.42 | 93.0 | 0.87 | 1.478 |
| Cntl.4 | 2.04 | 92.3 | 0.68 | 1.497 |
| C4 | 1.31 | 92.3 | 0.59 | 1.477 |

Dry LRI layers of the present invention show good light transmission and low haze.

Example 5: Spin-Coating of LRI-Layer

A composition of example 1 or 2 or 3 is filtered via a syringe filter (glas-fiber, 1 µm) before application. About 3 ml of each of the compositions are spin-coated to cover the whole surface of a 10 cm×10 cm sheet of PMMA or glass under the following spincoating conditions:

| Speed | 700-1000 rpm |
|---|---|
| acceleration | typically 100-500 rpm/s |
| time | 1:00 min |

Subsequently, the wet coating is dried using cold air or nitrogen. During drying, the film first gets turbid before getting transparent again. Subsequently, the air-dried film is placed on a hot-plate for the time period indicated below to completely dry and crosslink the film: On PMMA substrate, 10 minutes, plate temperature 55° C.; on glass substrate, 5 minutes, plate temperature 120° C. On both substrates, a dry film thickness of 2 µm is obtained.

Example 6: Applying LRI Layer by Print Roller

A composition of example 3 (3.2 or 3.3) is continuously applied to the surface of a print roller and transferred to a PET tape of width 27 cm. The wet layer is air dried and crosslinked in an oven directly after printing at a oven temperature of 60° C.

Example 7: Printing a Low Refractive Index Ink on Security Features

Mixing 60.97 g positively charged silica particles (23% dispersion in water, H5-042LT from Wifag Polytype) with 2.77% polyvinyl alcohol (Mowiol 90-88, Kuraray) and 32.96 g water, 3.3 g tetraethoxysilane (98% from Sigma Aldrich). The mixture is heated to 60° C. for one hour and cooled to room temperature over night. The resulting ink viscosity of 330 seconds (Din 53211 of 06/1987; cup 4 mm) is adjusted to 120 seconds by adding 10% of water.

Printing Conditions

Low refractive index ink is printed by gravure on UV casted security holograms (substrate Melinex 506 Dupont Teijin Films) at 20 m/min, and heated at 90° C.

Using a gravure cylinder of 120 l/cm, good transparency and hologram visibility is obtained.

Overcoating

The low refractive printed ink is overcoated with a nitrocellulose clear varnish (10% wt DHM10/25, Nobel Enterprise, in n-propylacetate) or with a polyvinyl alcohol based clear varnish (7 wt % in water, Poval 95-88 or Poval 235, Kuraray).

The same process is used with Fresnel lens or tower structures on transparent film. The same process is used with Fresnel lens or tower structures on paper and board.

Example 8: Preparation of Coating Compositions for Bar Coating

Positively charged silica particles are prepared in accordance with example 2 of WO 2013/117334 using aluminium chlorohydrate, n-butylaminopropyltrimethoxysilane, fumed silica and aq. ammonium hydrogen carbonate in amounts and qualities as described. This results in a 25% b.w. dispersion. The solution containing negatively charged silica particles is used as received from Cabot (Cab-O-Sperse 4012K, 13.1% b.w.). The dispersion of particles is heated to approximately 40° C. and a solution of 6.9% b.w. polyvinyl alcohol (Kuraray, Mowiol 18-88), deionized water and a 5.3% b.w. solution of Abex EP110 (anionic surfactant, Solvay) in water are added. The mixture is stirred for several minutes (5-60 min) and TEOS (99%, Wacker) is added, where applicable. Before coating, the solutions were allowed to cool to r.t.

Compositions of the coating solutions are listed in the following tables.

TABLE 8

Comparative compositions (8.1 containing cationic, 8.2 anionic particles)

| Composition: | 8.1 | 8.2 |
|---|---|---|
| ratio $SiO_2$—NP:PVA | 17:1 | 12:1 |
| silica dispersion | 53.0 g | 68.9 g |
| 6.9% b.w. aq. PVA | 11.0 g | 10.9 g |
| 5.3 wt % aq. surfactant | 1.07 g | 1.07 g |
| TEOS | 0.48 g | 0.48 g |
| $H_2O$ | 34.4 g | 18.6 g |

Example 9: Bar-Coating of the Coating Solutions

The coating solutions of example 8 are applied via bar-coater using a meyer-bar (40 μm wet film thickness) onto glass or PET substrates. Wet films of thickness 40 micrometer are dried at air for 1-10 min and then heated to 80° C. for 5 min. The resulting films are characterized by their transmission (BYK, HazeGard® plus), haze (ASTM D1003-13; BYK, HazeGard® plus), dry film thickness (micrometer; Metricon® prism coupler Model 2010/M) and refractive index (Metricon® prism coupler Model 2010/M; whereever mentioned in this example, refractive indices (mentioned below as "index") are as determined for a radiation of 513.7 nm). These characteristics are summarized in the following Tables:

TABLE 9.1

Characterization of dry films on glass (40 micrometer wet thickness; asterisk denotes composition of the invention)

| Composition | Haze | % Transmission |
|---|---|---|
| 8.1* | 2.7 | 93.7 |
| 8.2 | 50.2 | 91.4 |

TABLE 9.2

Characterization of dry films on PET (40 micrometer wet thickness; asterisk denotes composition of the invention)

| Composition | Haze | % Transmission | dry thickness | refractive index |
|---|---|---|---|---|
| 8.1* | 2.5 | 92.9 | 1.38 | 1.147 |
| 8.2 | 28.0 | 92.5 | 1.17 | 1.139 |

Exchanging present cationic particles with anionic particles results in an unacceptable increase of haze.

The invention claimed is:

1. A coating composition comprising a polar polymer and further comprising a tetraalkoxysilane and modified silica nanoparticles having a positively charged surface; wherein the polar polymer is selected from polymers of vinyl alcohol, hydroxyalkylacrylates, and copolymers consisting of at least 90% repeating units derived from vinylalcohol and/or hydroxyalkylacrylate and/or hydroxyalkylmethacrylate; wherein a weight ratio of the modified silica nanoparticles to the polar polymer ranges from 4:1 to 25:1; and wherein the coating composition comprises, based on a total weight of the composition, from 0.1 to 10% b.w. of the polar polymer, from 0.5 to 20% b.w. of the tetraalkoxysilane, from 4 to 25% b.w. of the modified silica nanoparticles having a positively charged surface, optionally 0 to 5% by weight of further components different from water, and water ad 100%.

2. The coating composition of claim 1, wherein the polar polymer is polyvinyl alcohol and the tetraalkoxysilane is tetraethoxysilane.

3. The coating composition of claim 1, wherein the composition consists of, based on a total weight of non-volatiles, 3 to 60% b.w. of the polar polymer, 1 to 30% b.w. of the tetraalkoxysilane, 39 to 95% b.w. of the modified silica nanoparticles having a positively charged surface, and optionally 0 to 10% by weight of further components selected from the group consisting of polar organic solvents, surfactants, further polymers, further crosslinking agents, light stabilizers, antioxidants, rheologic or thixotropic agents, and levelling agents.

4. A cured composition, which is obtainable by drying a composition according to claim 1.

5. A process for manufacturing an optical coating, the process comprising the steps of
   a) providing a solid or flexible substrate,
   b) applying a coating composition according to claim 1 in direct optical contact onto said substrate, and
   c) drying a coating layer obtained in step (b).

6. The process of claim 5, wherein the substrate provided in step (a) is selected from glass, polymer sheets, polymer films, metal, ceramics; and/or wherein the drying step (c) is effected by subjecting the coating layer obtained in step (b) to heating, such that a temperature of the layer reaches 50° C. or more.

7. The process of claim 5, wherein the substrate provided in step (a) is selected from optical substrates such as transparent glass, transparent polymer sheets, transparent polymer films, and metal substrates and substrates covered by a metal film.

8. The process of claim 5, wherein a thickness of the layer after step (c) is in a range of 20 nm to 100 micrometer.

9. A method of using a coating composition as described in claim 1 to obtain an antireflective and/or hydrophobicity reducing and/or adhesive effect on a surface, and/or to modify interfacial or surface tension.

10. A method for obtaining an antireflective and/or hydrophobicity reducing and/or adhesive and/or interfacial or surface tension modifying effect, the method comprising a step of coating a surface with a coating composition as described in claim 1.

11. The coating composition of claim 1, wherein the polar polymer is water soluble.

12. A cured composition in a form of a porous coating layer, which is obtainable by drying a composition according to claim 1.

13. The process according to claim 5, wherein the optical coating is a porous coating suitable as an optical low reflective and/or antireflex coating.

14. The process of claim 5, wherein a thickness of the layer after step (c) is in a range of 100 nm to 20 micrometer.

15. The coating composition of claim 1, wherein the tetraalkoxysilane is tetraethoxysilane.

* * * * *